United States Patent [19]

Motoyama et al.

[11] Patent Number: 5,438,650
[45] Date of Patent: Aug. 1, 1995

[54] METHOD AND SYSTEM TO RECOGNIZE ENCODING TYPE IN DOCUMENT PROCESSING LANGUAGE

[75] Inventors: Tetsuo Motoyama; Donny Tsay, both of San Jose, Calif.

[73] Assignees: Ricoh Company, Ltd., Tokyo, Japan; Ricoh Corporation, San Jose, Calif.

[21] Appl. No.: 6,416

[22] Filed: Jan. 19, 1993

Related U.S. Application Data

[63] Continuation-in-part of Ser. No. 931,808, Aug. 11, 1992, which is a continuation-in-part of Ser. No. 876,601, Apr. 30, 1992, Pat. No. 5,319,748, and Ser. No. 876,251, Apr. 30, 1992, Pat. No. 5,325,484.

[51] Int. Cl.$^6$ ............................................... G06F 3/12
[52] U.S. Cl. .................................................... 395/114
[58] Field of Search ............... 395/100, 109, 114, 144, 395/200, 295; 358/462, 467

[56] References Cited

U.S. PATENT DOCUMENTS

| | | | |
|---|---|---|---|
| 4,994,998 | 2/1991 | Anezaki | 364/900 |
| 5,263,137 | 11/1993 | Anezaki | 395/200 |
| 5,291,583 | 3/1994 | Bapat | 395/500 |
| 5,303,336 | 4/1994 | Kageyama et al. | 395/114 |
| 5,323,393 | 6/1994 | Barrett et al. | 370/85.8 |
| 5,353,388 | 10/1994 | Motoyama | 395/117 |

OTHER PUBLICATIONS

ISO/IEC DIS 10180, Information Processing–Text Communication–Standard Page Description Language; Draft International Standard 1991–03, 1991.
ISO/IEC 8824, Information technology–Open Systems Interconenction–Specification of Abstract Syntax Notation One (ASN.1), International Standard (1990).
ISO/IEC 8825, Information technology–Open Systems Interconnection–Specification of Basic Encoding Rules for Abstract Syntax Notation One (ASN.1( (1990).

*Primary Examiner*—Mark R. Powell
*Assistant Examiner*—Gabriel I. Garcia
*Attorney, Agent, or Firm*—Oblon, Spivak, McClelland, Maier, & Neustadt

[57] ABSTRACT

A method and system to efficiently and automatically determine whether a document to be processed and printed has been encoded in a binary or clear text representation of a page description language. The document is initially processed as if it were binary encoded and the first three tags of the document are examined to determine if they contain the object identifier having the value "28 CF 44 00 H". If one of the first three tags has this value, an encoding flag is set to indicate the document is a binary SPDL file and the recognition process is terminated. If the document is determined not to be a binary SPDL file it is examined to see if it is clear text SPDL file. The beginning of the document is examined to determine if it contains zero or more S separators which are defined to be spaces, carriage returns, line feeds, and tabs followed by the characters "<!DOCTYPE" regardless of capitalization followed by one or more S separators followed by the characters "SPDL". If these characters exist in order, the document is determined to be a clear text encoded SPDL document. The binary and clear text encoded SPDL documents are then processed for printing. If the document is determined not to be a clear text or binary encoded SPDL document, an indication is given that the file is not an SPDL file.

32 Claims, 12 Drawing Sheets

```
SPDL-Instance ::= EXTERNAL (WITH COMPONENTS {
    direct-reference        OBJECT IDENTIFIER (spdl-id) PRESENT,
    indirect-reference      ABSENT,
    data-value-descriptor   ABSENT,
    encoding                (WITH COMPONENTS {
        single-ASN1-type        (INCLUDES Document | Resource-Defl
                                 Includable-Structure),
        octet-aligned           ABSENT,
        arbitrary               ABSENT}) PRESENT})
```

Requirements for a Binary SPDL File

*FIG. 1  PRIOR ART*

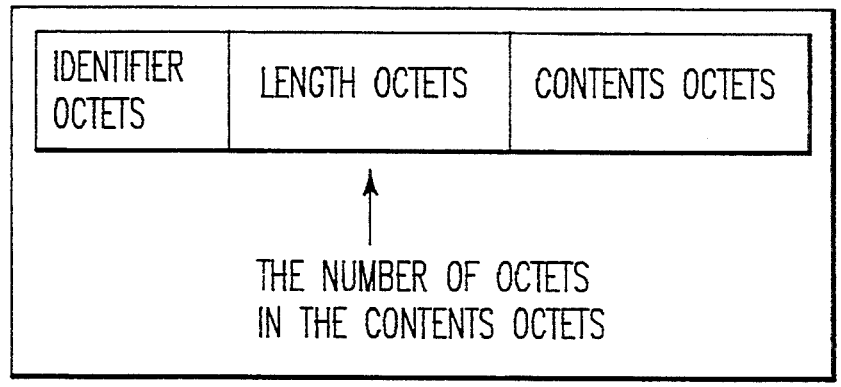

Structure of Binary Encoding

*FIG. 2  PRIOR ART*

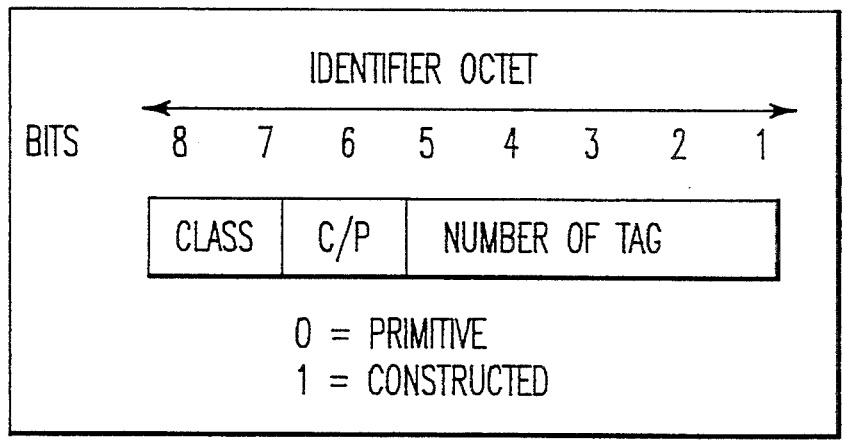

*FIG. 3  PRIOR ART*

| CLASS | BIT 8 | BIT 7 |
|---|---|---|
| UNIVERSAL | 0 | 0 |
| APPLICATION | 0 | 1 |
| CONTEXT-SPECIFIC | 1 | 0 |
| PRIVATE | 1 | 1 |

ENCODING OF CLASS OF TAG

*FIG. 4   PRIOR ART*

| | |
|---|---|
| UNIVERSAL 1 | BOOLEAN TYPE |
| UNIVERSAL 2 | INTEGER TYPE |
| UNIVERSAL 3 | BITSTRING TYPE |
| UNIVERSAL 4 | OCTETSTRING TYPE |
| UNIVERSAL 5 | NULL TYPE |
| UNIVERSAL 6 | OBJECT IDENTIFIER TYPE |
| UNIVERSAL 7 | OBJECT DESCRIPTOR TYPE |
| UNIVERSAL 8 | EXTERNAL TYPE |
| UNIVERSAL 9 | REAL TYPE |
| UNIVERSAL 10 | ENUMERATED TYPE |
| UNIVERSAL 11-15 | RESERVE FOR FUTURE EDITIONS OF THIS INTERNATIONAL STANDARD |
| UNIVERSAL 16 | SEQUENCE AND SEQUENCE-OF TYPES |
| UNIVERSAL 17 | SET AND SET-OF TYPES |
| UNIVERSAL 18-22,25-27 | CHARACTER STRING TYPES |
| UNIVERSAL 23-24 | TIME TYPES |
| UNIVERSAL 26 | RESERVE FOR ADDENDA TO THIS INTERNATIONAL STANDARD |

UNIVERSAL CLASS TAG ASSIGNMENTS

*FIG. 5   PRIOR ART*

```
00101000 LENGTH    00110000 LENGTH    00000110  00000100  28 CF 44 00H
EXTERNAL           SEQUENCE
                   (OPTIONAL)         IDENTIFIER  LENGTH   CONTENT
                                      OCTET       OCTET    OCTETS

OBJECT IDENTIFIER

FIRST THREE TAGS OF A BINARY SPDL DOCUMENT
```

```
S SEPERATORS     <! DOCTYPE     S SEPARATOR(S)      SPDL

OPTIONAL                       AT LEAST ONE

BEGINNING OF A CLEAR TEXT SPDL DOCUMENT
```

METHOD AND SYSTEM TO RECOGNIZE ENCODING TYPE IN DOCUMENT PROCESSING LANGUAGE

CROSS-REFERENCES TO RELATED APPLICATIONS

This application is a continuation-in-part of U.S. patent application Ser. No.07/931,808 filed on Aug. 11, 1992 and entitled "A Method and System to Handle Dictionary Generation and Context Declaration in a Document Processing Language" which is a continuation-in-part of U.S. patent application Ser. Nos. 07/876,601, now U.S. Pat. No. 5.319,718, and 07/876,251, now U.S. Pat. No. 5,325,484 both filed on Apr. 30, 1992 and entitled "Method and Apparatus to Manage Picture and Pageset for Document Processing" and "Method and System to Handle Inclusion of External Files into a Document Processing Language," respectively.

BACKGROUND OF THE INVENTION

1. Field of the Invention

This invention relates generally to a final form document and to automatic recognition of the type of encoding used to encode the final form document into a standard page description language. In this context, a final form document is not only envisaged as commands to a computer printer but also as commands to a remote fax printer or other types of display or presentation devices. This invention particularly relates to a method and system to efficiently and automatically determine whether a document has been encoded in the Standard Page Description Language and if encoded in the Standard Page Description Language, whether it has been encoded in a binary format or in a clear text format.

2. Discussion of the Background

PostScript® by Adobe Systems, Inc. is a page description language ("PDL") which was originally only a clear text encoding language. A clear text encoding language is a type of computer language which is human readable. An example of a non-clear text encoding language would be a binary encoding of a document as a human could not readily understand the contents of the document by looking at the binary or hexadecimal representation of the document. In the PostScript Level 2 system and the display PostScript systems, Adobe added the binary token and binary object encodings.

To determine if a file is a clear text or binary encoded PostScript file, the first character in the file is examined and if it is found to be in the range of 128 to 159 it is considered a binary PostScript file. In the recommended syntax of PostScript, for clear text, the first line in the program is recommended to begin with "%!PS-Adobe-3.0". It is believed that this comment line at the beginning of a file should have no spaces before the comment and no spaces interposed during the comment. This comment signals a document manager that the file contains a program which conforms to version 3.0 of the Document Structure Convention of PostScript and is in fact a PostScript file. To determine if a document is a PostScript file, one only has to examine if the pattern "%!PS-Adobe-3.0" is at the very beginning of the file. However, the language itself is not self-identifying to be PostScript. Therefore, the omission of this first line does not cause the PostScript Interpreter to reject the input.

The Standard Page Description Language is a proposed PDL in the process of being developed as an international standard by several people including the inventors herein. The proposal is currently in draft form before a section of the International Standards Organization ("ISO") as ISO/IEC DIS 10180 and is available through the American National Standards Institute ("ANSI") in New York. Both binary and clear text SPDL documents contain a header which identifies that the input is SPDL.

SUMMARY OF THE INVENTION

It is an object of this invention to provide a method and system to recognize whether the input data has been encoded into a binary or clear text representation of the Standard Page Description Language.

It is another objective of this invention to provide a method and system to recognize whether the input data is Standard Page Description Language data.

These and other objects are achieved according to the present invention by providing an efficient method and apparatus for determining whether a file is an SPDL file and if the file is determined to be an SPDL file, whether the SPDL file is encoded in a binary or clear text format.

The method and system of this invention process the files as if they are a binary file and an examination is made of the first three tags to determine if they contain an object identifier 28 CF 44 00H. If this object identifier exists within the first three tags, the file is determined to be an SPDL file in the binary format and an encoding flag is set equal to binary.

If the first three tags do not contain the object identifier 28 CF 44 00H, the file is reexamined to determine if it has been encoded into a clear text format. Processing then goes back to the first byte of the file where it determines if the first byte is an optional "S separator". S separators are defined to be a Space, CR, LF, or Tab. If the first byte is an S separator, subsequent bytes are read until there are no more separators.

Next, the characters "<!DOCTYPE" must be encountered. No distinction is made as to whether the letters are upper or lowercase. If the characters "<!DOCTYPE" are not encountered, the document is determined to be neither a binary nor clear text SPDL file. To meet SPDL language requirements, the next character must be an S separator followed by zero or more S separators. If this pattern is not found, the document is not an SPDL document. The next sequence of characters must be "SPDL" without the distinction of upper or lowercase letters. If "SPDL" is found, the document is a clear text SPDL file. If for any reason the document is determined not to be a binary nor clear text SPDL file, a routine is called which indicates that the file is not an SPDL file and an error flag is set to an error code.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 illustrates the requirements for the beginning of a binary encoding of a binary SPDL file;

FIG. 2 is an illustration of the structure of a binary encoding as defined in ISO/IEC 8825;

FIG. 3 illustrates the makeup of an identifier octet as defined in ISO/IEC 8825;

FIG. 4 illustrates how differing class tags are encoded in bits 7 and 8 of the identifier octets as defined in ISO/IEC 8825;

FIG. 5 illustrates the class tag assignments for the universal class tags as defined in ISO/IEC 8824;

DESCRIPTION OF THE PREFERRED EMBODIMENTS

Figures 6, 7, 8:
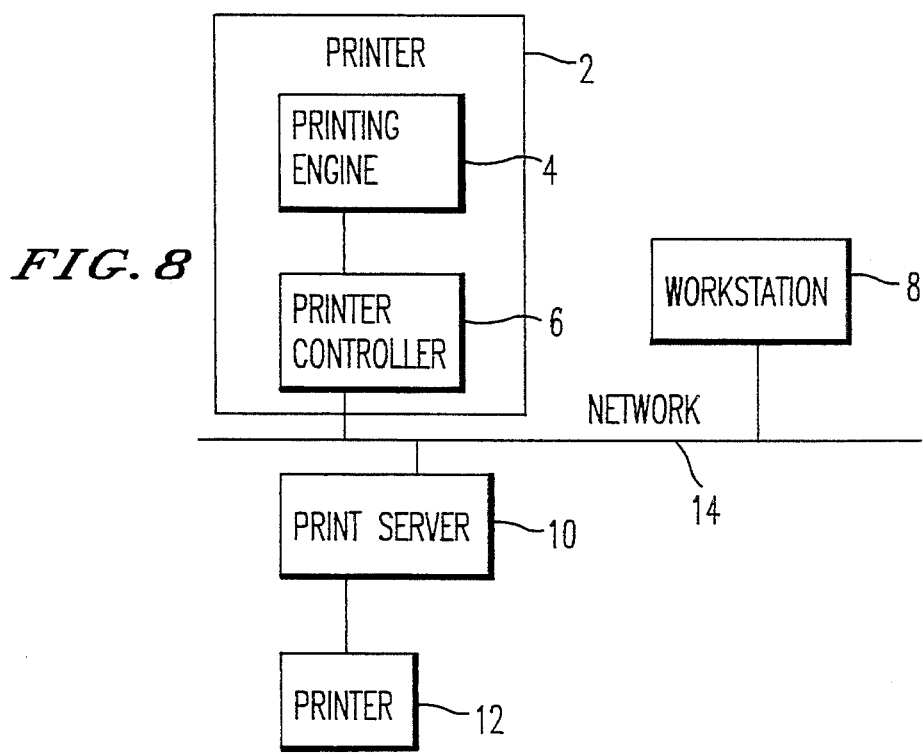
FIG. 6 illustrates the first three tags of a binary encoded SPDL document.
FIG. 7 illustrates how the beginning of a clear text SPDL document are encoded.
FIG. 8 illustrates a computer network for employing the present invention.

Referring now to the drawings, wherein like reference numerals designate identical or corresponding parts throughout the several views, and more particularly to FIG. 1 thereof, there is illustrated the rules of construction of the header or beginning portion of a binary SPDL file as illustrated in the document ISO/IEC JTC 1/SC 18/WG 8 N 1453 as modified at the Sep. 30, 1992 meeting of the SPDL ISO Committee. FIG. 1 illustrates that the header of a binary SPDL file is an external type class tag, containing a direct reference to an object identifier containing the SPDL-ID. A binary SPDL document is encoded according to Abstract Syntax Notation One (ASN. 1) as defined in ISO/IEC 8824:1990 and follows the Basic Encoding Rules as defined in ISO/IEC 8825:1990.

FIG. 2 illustrates the structure of binary encoding of an SPDL document as defined in ISO/IEC 8825. The encoding of each structure element begins with one or more identifier octets, followed by one or more length octets, followed by one or more content octets.

FIG. 3 illustrates the structure of an identifier octet as defined in ISO/IEC 8825. Bits 8 and 7 of the identifier octet define the class of the structure, and bit 6 of the octet indicates whether the structure is a primitive structure or constructed structure. In this context, the word primitive means that the structure being encoded does not consist of an additional structure element and that the content octets of the primitive contain only data. A zero in bit 6 of the identifier octet indicates a primitive structure. A one in bit 6 of the identifier octet indicates the structure element is a constructed element which means that there are further structure elements in the content octets. Bits 1 through 5 of the identifier octet contain the identification number of the tag.

FIG. 4 illustrates the types of classes and their encoding in the identifier octet. For example, when bit 8 and bit 7 of the identifier octet are both 0, the class of the tag is universal.

FIG. 5 illustrates the universal class tag assignments as defined in ISO/IEC 8824. For example, universal 8 is an external class, universal 16 is a sequence class, and universal 6 is an object identifier class.

FIG. 6 illustrates the first three tags of a binary SPDL document. The first tag is a universal external. For example, the leftmost two bits of the first byte are 00 indicating the class is universal, the next bit is 1 indicating the encoding is constructed which means it contains additional structure elements, and the rightmost five bits represents a binary 8 which indicates an external type tag. External type tags permit the inclusion of any data value from an identified set (see ISO/IEC 8824 for details). The next byte is a length byte of the first tag. As there are optional elements for the various tags, the length octet of the first tag cannot be determined unless it is known whether the optional elements of the tags exist.

The second tag of the beginning of a binary SPDL document is an optional sequence. As illustrated in FIG. 6, the optional sequence is a universal constructed tag having a class tag assignment of 16. Following the sequence octet is the length octet. However, as there are optional items, the length of the tag cannot be determined unless it is known whether or not any optional items are present.

The next tag is the object identifier tag. Note that if the optional sequence is not present as the second tag, the object identifier will be the second tag instead of the third tag. The object identifier tag contains an identifier octet, a length octet and content octets. The first two bits of the identifier octet are 00 indicating a universal class tag. The third bit is 0, indicating that the class tag is primitive and therefore not made up of other structure elements. The last five bits contain the binary representation of 6 indicating the tag is an object identifier. The next octet is the length octet which contains the binary representation of 4 indicating that there will be four bytes of content octets. The content octets are 28 CF 44 00H which indicates that the file is a binary SPDL file.

For clear text encoded SPDL files, SPDL encodes files according to the Standard Generalized Markup Language ("SGML"), as defined in ISO 8879:1986. FIG. 7 illustrates how under this definition the beginning or header of a clear text SPDL file must be encoded. The file begins with 0 or more S separators. S separators are the ASCII characters Space, CR (carriage return), LF (line feed) or Tab. After the 0 or more S separators are the characters "<!DOCTYPE". Next is at least one S separators followed by the characters "SPDL". The capitalization of the letters of the header of a clear text SPDL file is irrelevant.

FIG. 8 illustrates a network and various devices connected thereto, any of which can employ the present invention. Connected to the network 14 is a printer 2 having a printer controller 6 and a printing engine 4. Workstation 8 is also connected to the network along with print server 10 connected to printer 12.

Figure 9:
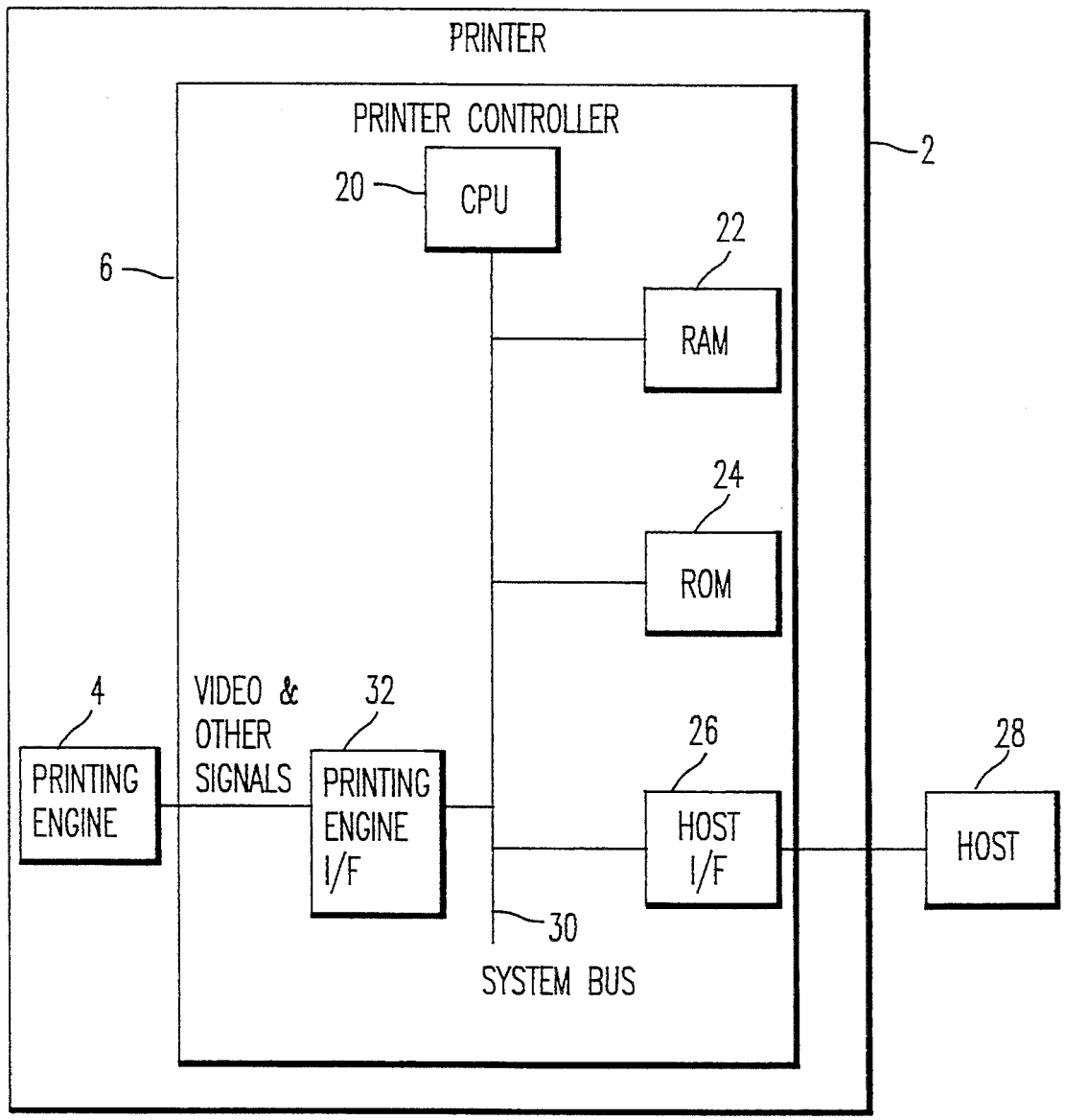
FIG. 9 illustrates a printer controller for employing the present invention.

FIG. 9 illustrates the details of the printer controller 6 of printer 2. The printer controller is connected to a host 28 through a host interface 26. Host 28 can be any computer and could, for example be a workstation 8. The workstation 8 can be connected to host 28 through the network 14, a serial printer cable, or a parallel printer cable, for example. The printer controller also contains a CPU 20, RAM 22, ROM 24 embodying the process of the present invention, a printing engine interface 32, and a system bus 30 connecting the elements of the printer controller. The printing engine interface 32 outputs rasterized image data in the form of video and other signals to the printer engine 4.

Figure 10:
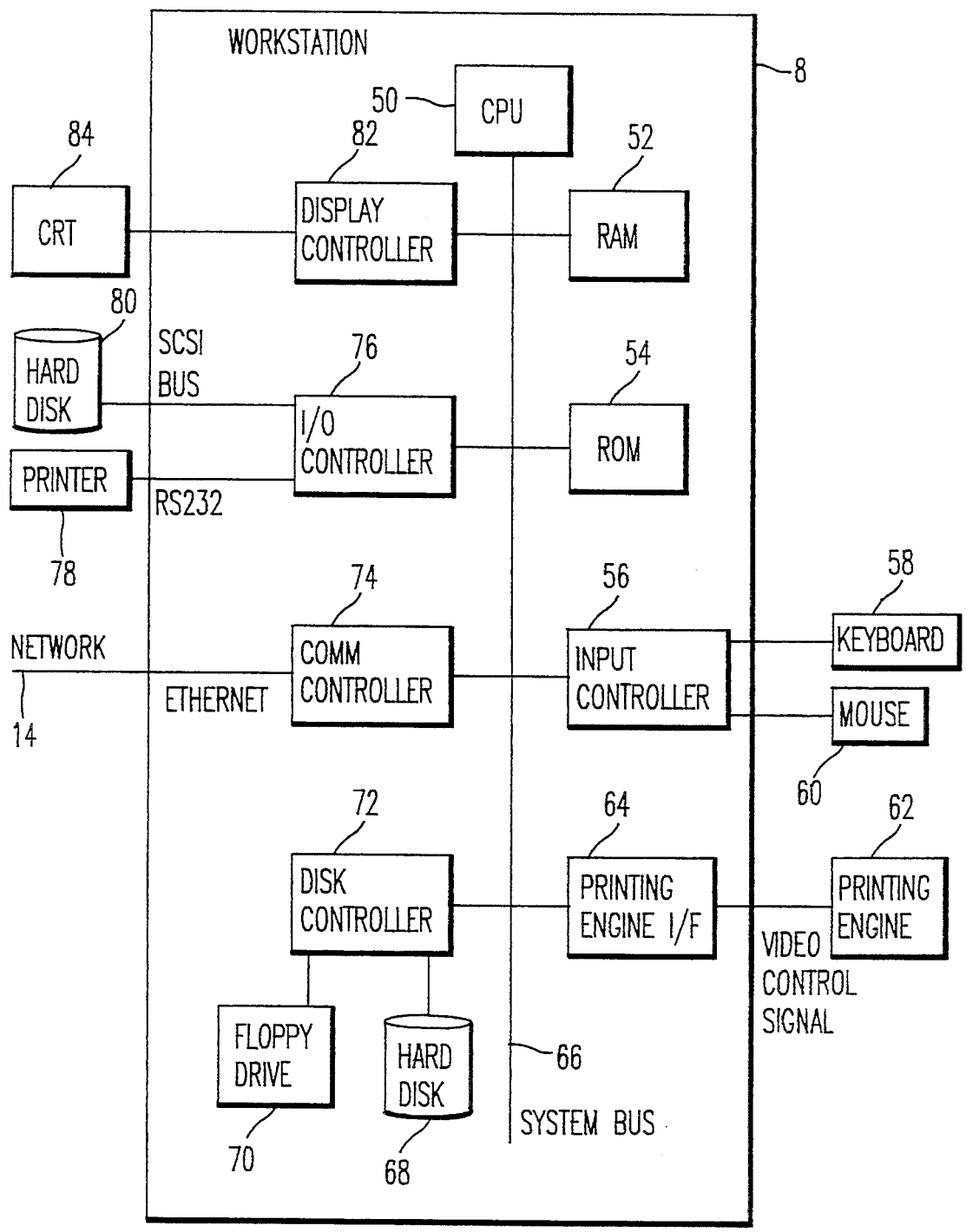
FIG. 10 illustrates a workstation for employing the present invention.

FIG. 10 illustrates the makeup of workstation 8. Workstation 8 contains CPU 50, RAM 52, ROM 54, input controller 56 connected to a keyboard 58 and mouse 60. A printing engine interface is connected directly to a printing engine 62 which receives video and control signals for rasterized image data transmitted by the printer engine interface 64. The workstation further contains a disk controller 72 connected to a hard disk 68 and floppy drive 70, a communication controller 74 for connection to the network 14 which can be for example, an Ethernet ® network, an I/O controller 76 connected to an external hard disk 80 through a SCSI bus, for example, and a printer 78, connected through an RS-232 cable, for example. The workstation also contains a display controller 82 connected to a CRT 84. A system bus 66 connects the elements within the workstation.

An SPDL file to be processed and printed can be directly created by workstation 8 or can be first created by workstation 8 and then stored in either of the hard disks 68 or 80, the floppy drive 70 or the RAM 52 for example. The SPDL file can then be processed for printing by the CPU 50 but it is first necessary to determine whether the SPDL file has been encoded in the clear text or binary format. The process for determining the encoding format of the SPDL file can be stored in ROM 54, hard disks 68 or 80, or RAM 52, for example. Once the encoding format of the SPDL file has been determined, CPU 50 can process the SPDL file into rasterized image data which is sent through bus 66 through printer engine interface 64 and finally to printing engine 62 in the form of video and control signals so the image data can be printed on printing engine 62.

If the workstation or any SPDL processing system wants to include an SPDL encoded picture stored in the storage means into the current document to be processed, the workstation or other processing system must determine the encoding format. When the output SPDL file is created, the encoding format of the included picture might need to be changed.

Figure 11:
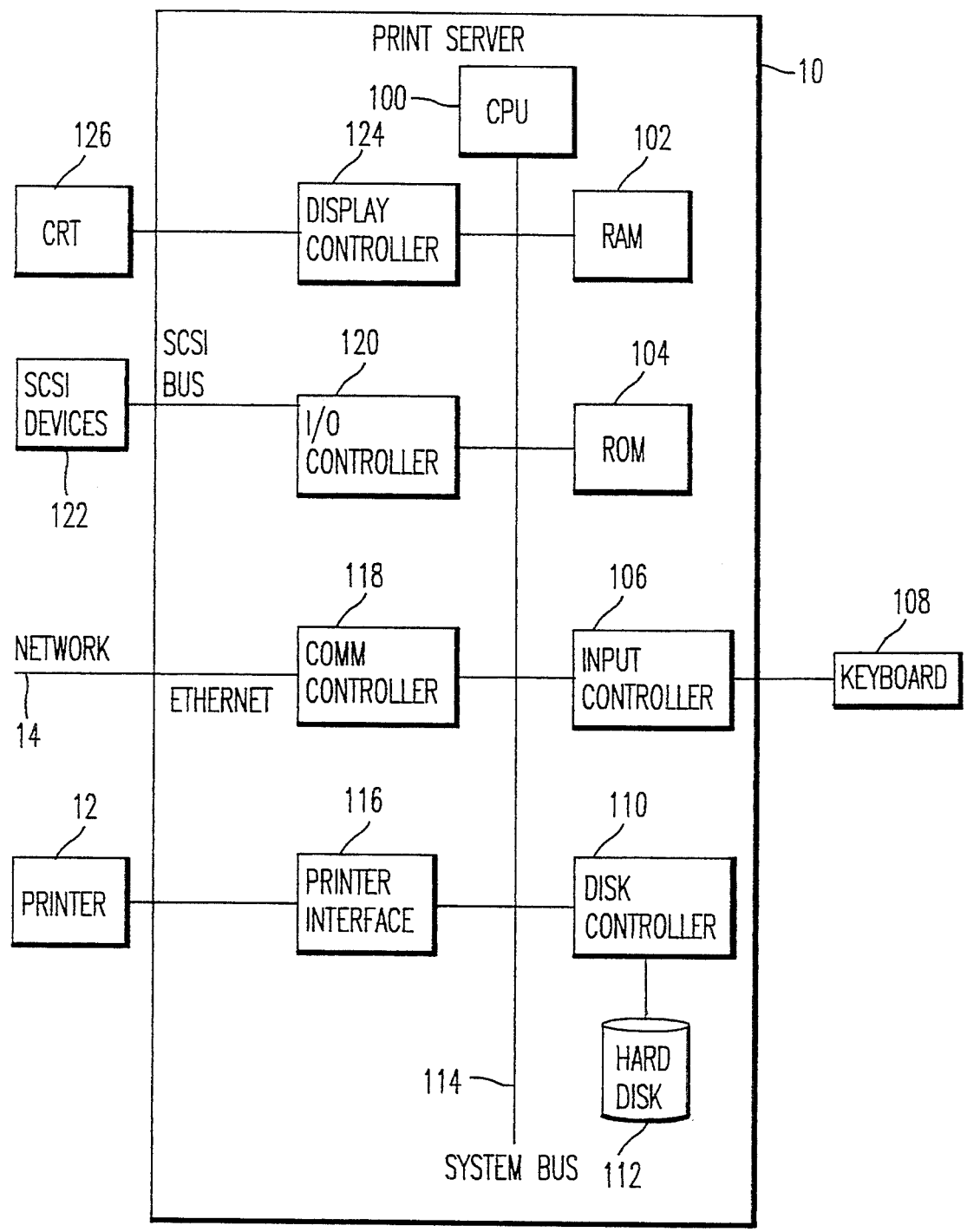
FIG. 11 illustrates a print server for employing the present invention.

The print server 10 illustrated in FIG. 11 has a basic makeup very similar to workstation 8. The print server 10 receives an SPDL file sent over the network 14 and received by communication controller 118. The CPU 100 determines whether the received file is in the binary or clear text SPDL format or some other encoding format according to the process of the present invention. Next, the file is processed by the CPU and sent over system bus 114 to printer interface 116 to printer 12. The CPU 100 can process the document into different formats. For example, the SPDL document can be processed into a PostScript representation and transmitted to a printer 12 which would be PostScript compatible. Alternatively, the CPU 100 can process the SPDL file into one of the escape sequence type of languages, such as those that are native to the Hewlett Packard (HP) Laserjet ® series of printers (e.g. PCL) and therefore, it can be assumed in this circumstance printer 12 would be HP Laserjet ® compatible. It is also possible for the CPU to process the SPDL document into a format used by raster capable printers such as dot matrix, inkjet, or thermal printers, or any other type of raster capable printer. It is also possible that the CPU 100 processes the SPDL file into a raster image, with the raster data then being sent to a printer engine within printer 12.

A portion of the present invention includes the recognition of a need of an SPDL processing system to know whether an input data stream is in a binary format or a clear text format. The present inventors have realized that there might be a need to include an SPDL encoded picture, which has been previously processed and stored, into a current document which is being processed. Therefore, the present inventors realized that a possible problem might exist unless the SPDL processing system could determine if the stored picture was encoded in SPDL and if the picture was encoded in SPDL, whether the SPDL was in a binary or clear text format. Therefore, when an SPDL file is being created which for example, inputs a previously encoded SPDL file, the encoding format of the previously encode SPDL file might need to be changed to the encoding format of the file being created. Consequently, the present invention includes both a determination as to whether a file is an SPDL file and whether the SPDL file is encoded in a binary or a clear text format.

Figure 12:
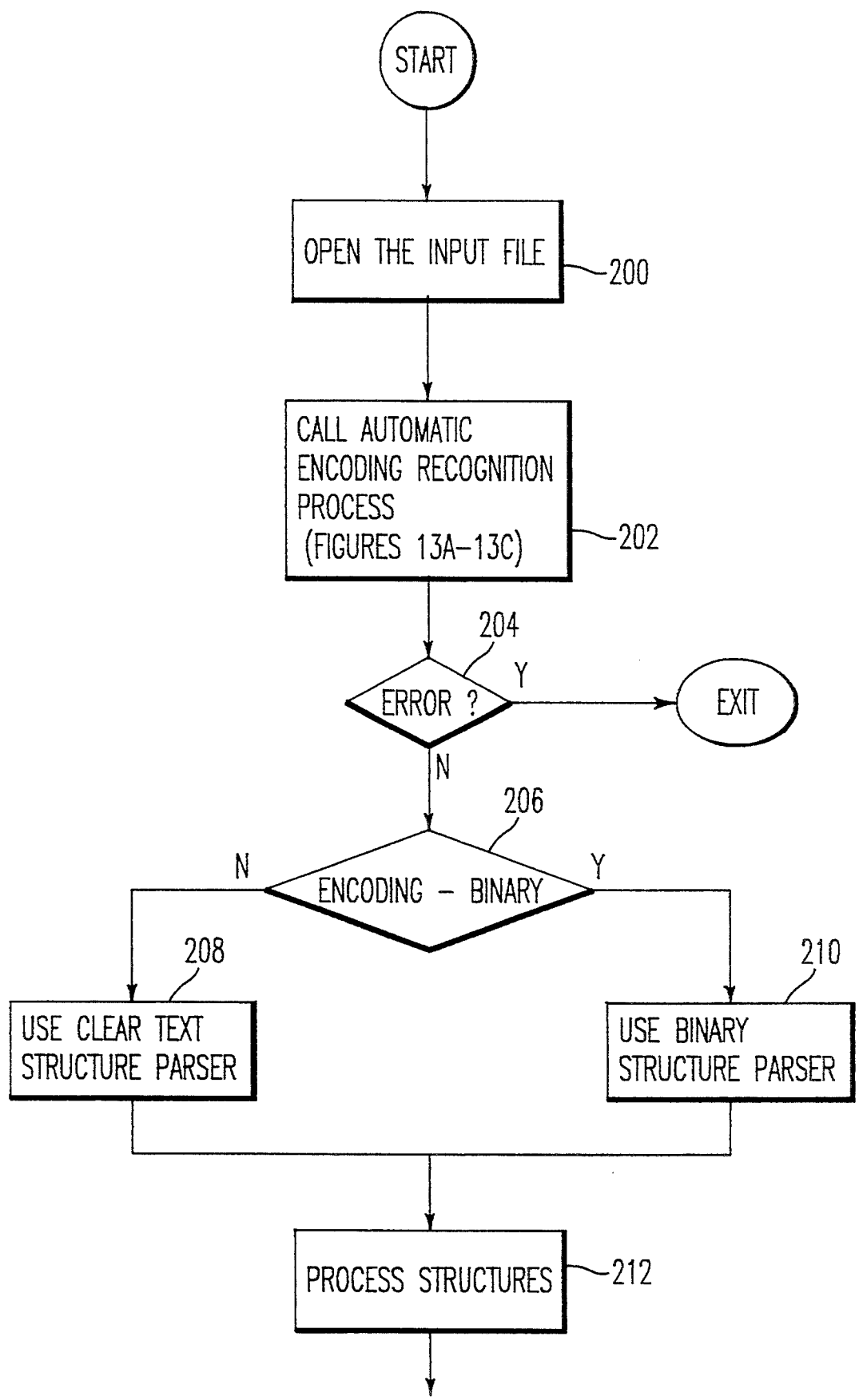
FIG. 12 illustrates a process used when an SPDL file is first being processed.
Figure 13A:
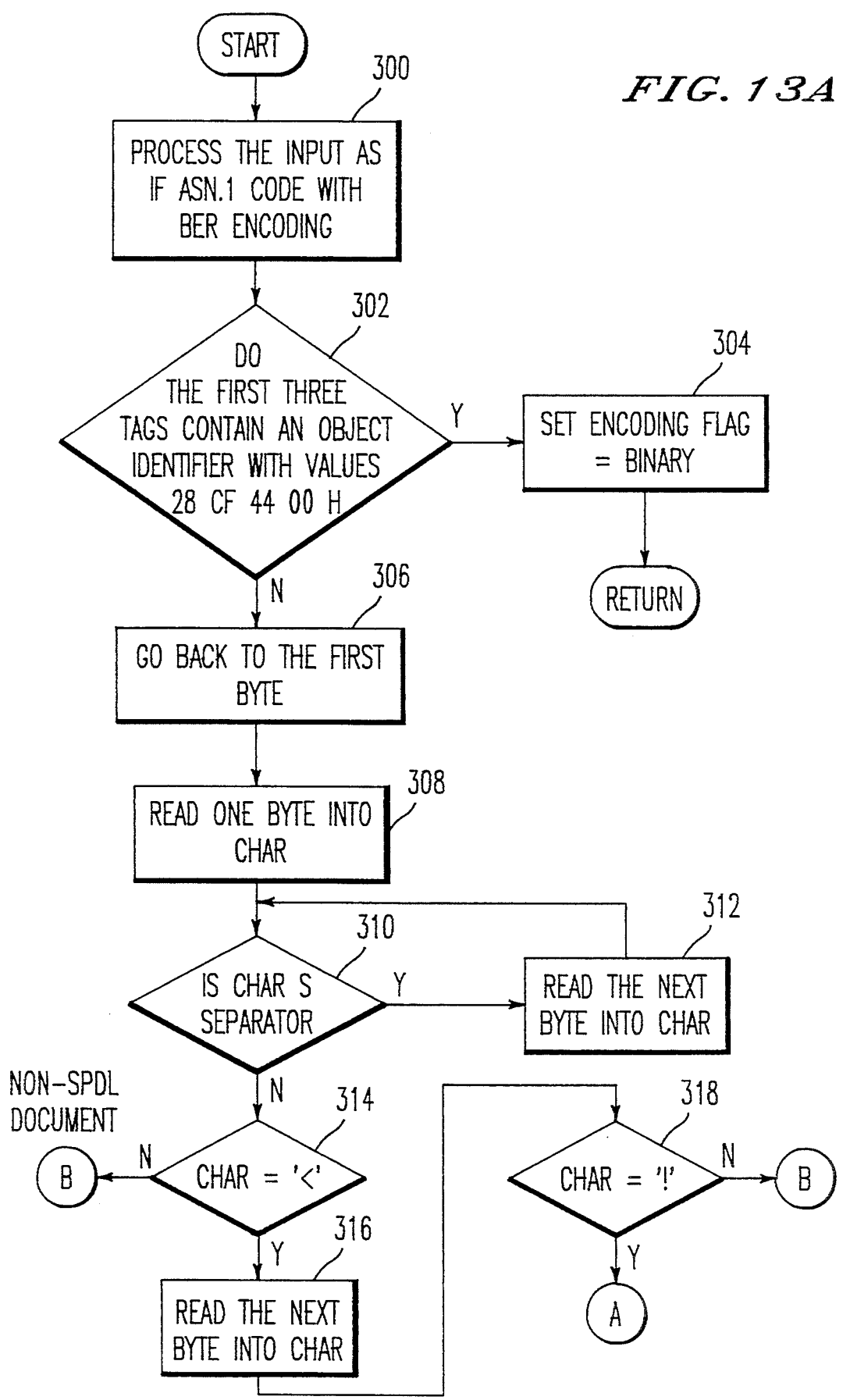
FIG. 13A–13C illustrate a process for determining if a file is a binary SPDL file, clear text SPDL file or non-SPDL file.
Figure 13B:
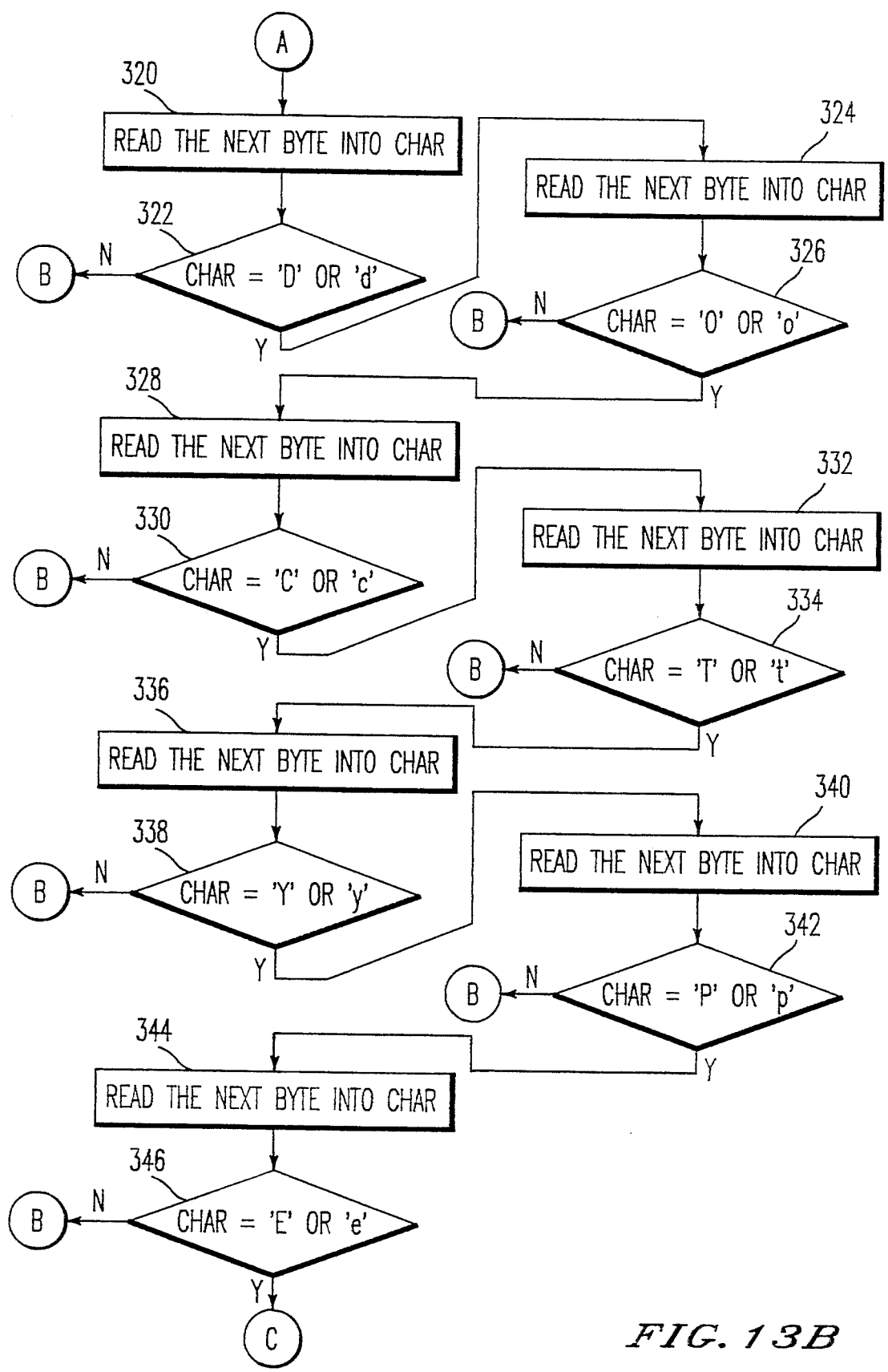
Figure 13C:
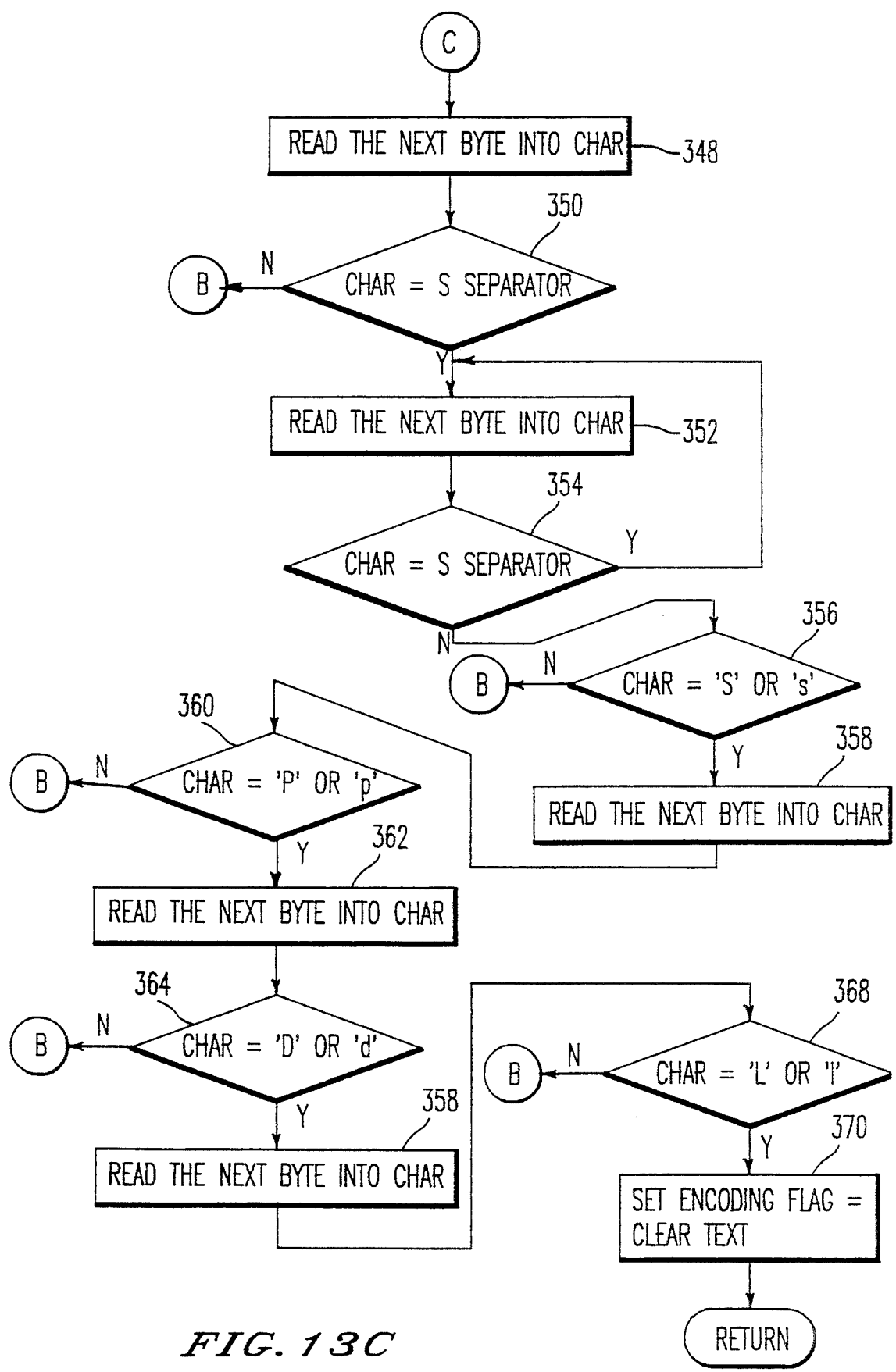
Figure 14:
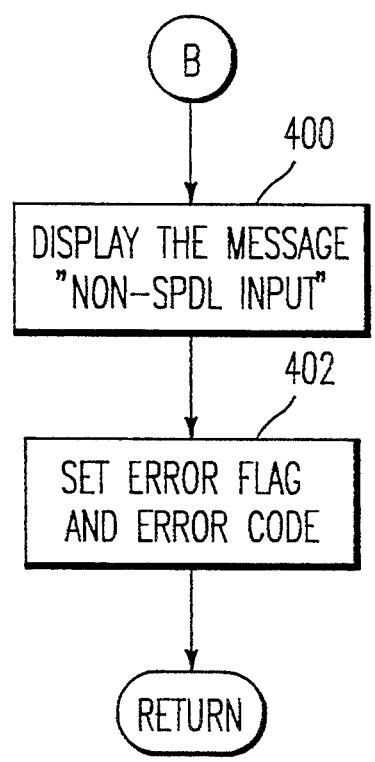
FIG. 14 illustrates a process used when a file is determined to be a non-SPDL file.

The process used to determine the encoding format of an SPDL document and to begin processing of the SPDL document is illustrated in FIGS. 12-14. This process can be executed by and embodied in any type of print server, workstation, printer controller, or any other type of computing device. The process begins in FIG. 12 by opening the input file in step 200. After the input file is opened, step 202 calls the automatic encoding recognition process set forth in the process illustrated in FIGS. 13A-13C.

In FIG. 13A, the input file is initially processed as if the document were encoded in a binary format according to Abstract Syntax Notation One ("ASN.1") as defined in ISO/IEC 8824:1990 according to the Basic Encoding Rules ("BER") for ASN.1 as defined in ISO/IEC 8825:1990. Flow proceeds to step 302 where the first three tags of the file are examined to determine if an object identifier contains the values 28 CF 44 00H. This object identifier will usually be found in the second or third tag. If an object identifier with the value 28 CF 44 00H is found within one of the first three tags, the document is a binary encoded SPDL document and flow proceeds to step 304 where the encoding flag is set equal to binary. Flow then returns to the process illustrated in FIG. 12. An example of the steps which can be performed within step 302 are as follows:

1. Is the first byte equal to 28H? If not, return N.
2. Process the next length byte(s) according to ISO/IEC 8825 encoding.
3. Is the next byte equal to 3OH? If not, go to step 5 below.
4. Process the next length byte(s) according to ISO/IEC 8825 encoding.
5. Are the next two bytes equal to 06H 04H? If not, return N.
6. Are the next four bytes =28 CF 44 00H? If not, return N.
7. Go to step 304.

If step 302 determines that the document does not contain a tag having an object identifier 28 CF 44 00H, the file is not encoded in the binary format and it is possible that the document is encoded in the clear text format. Therefore, the beginning of the document is examined to determine if it contains the proper clear text SPDL identifier. Step 308 reads the first byte of the file into the variable "CHAR". Step 310 determines if CHAR is equal to an S separator. An S separator includes the characters Space, CR (carriage return), LF (line feed) and Tab. Characters must be read in until the value in CHAR is not an S separator. Therefore, flow loops between steps 310 and 312 until the value in CHAR is not an S separator. When CHAR is not an S separator, flow proceeds to step 314 where CHAR is examined to see if it is equal to the symbol '<'. If it is not, process B illustrated in FIG. 14 is called because the document being processed is not a clear text SPDL file and has been previously determined not to be a binary SPDL file in step 302 and is therefore a non-SPDL document.

Steps 314 through 346 examine the bytes after the S separator at the beginning of the SPDL document and unless the characters "<!DOCTYPE" are encountered without regard to capitalization, the document is not an SPDL file and flow proceeds to the process B illustrated in FIG. 14. If the beginning of the file contains the characters "<!DOCTYPE" flow proceeds to step 348 where subsequent bytes of the open file must contain at least one S separator. If there is not one S separator immediately after the pattern "<!DOCTYPE" the file is a non-SPDL file and flow proceeds from step 350 to process B illustrated in FIG. 14. Steps 352 and 354 read bytes into the variable CHAR until there are no more S separators. Steps 356–368 examine if the bytes contain the characters "SPDL", regardless of capitalization. If the pattern "SPDL" is found, flow proceeds to step 370 where the encoding flag is set to clear text and flow returns to the process illustrated in FIG. 2. If the characters "SPDL" are not found, process B illustrated in FIG. 14 is called.

The process illustrated in FIG. 14 is called when the file is determined to be a non-SPDL document. Step 400 causes the display of the message "NON-SPDL INPUT" indicating that the file is neither binary SPDL encoded nor clear text SPDL encoded. In step 402, the error flag is set with an appropriate error code indicating the file is a non-SPDL document and flow then returns to step 202 of FIG. 12.

When flow returns to the process illustrated in FIG. 12, step 204 determines if an error has occurred by examining the error flag. If an error has occurred, there is not a properly encoded SPDL document contained within the opened file and the SPDL processing program illustrated in FIG. 12 is exited. It is possible that the file is a PostScript encoded file or another type of word processing file such as a WordPerfect ®HPGL ® or other proprietary file format Therefore, it is possible that further processing for printing of the non-SPDL document can occur, for example, after an error is detected in step 204. If no error has been detected in step 204, flow proceeds to step 206 where the encoding flag is examined to determine if the document is in the binary SPDL format. If it is, flow proceeds to step 210 where the binary structure parser is used and the structures are processed in step 212 according to the binary encoding rules.

If in step 206 the system determines that the file is encoded in clear text, flow proceeds to step 208 where the clear text structure parser is used to parse the open file as a clear text file. Flow then proceeds to step 212 where the structures are parsed as if they were clear text structures. The parsing steps use conventional parsing techniques which are well known and not discussed herein for the sake of brevity.

As the structures are processed in step 212, the entire file and document therein is processed which includes processing of all structure and content.

Figure 15:
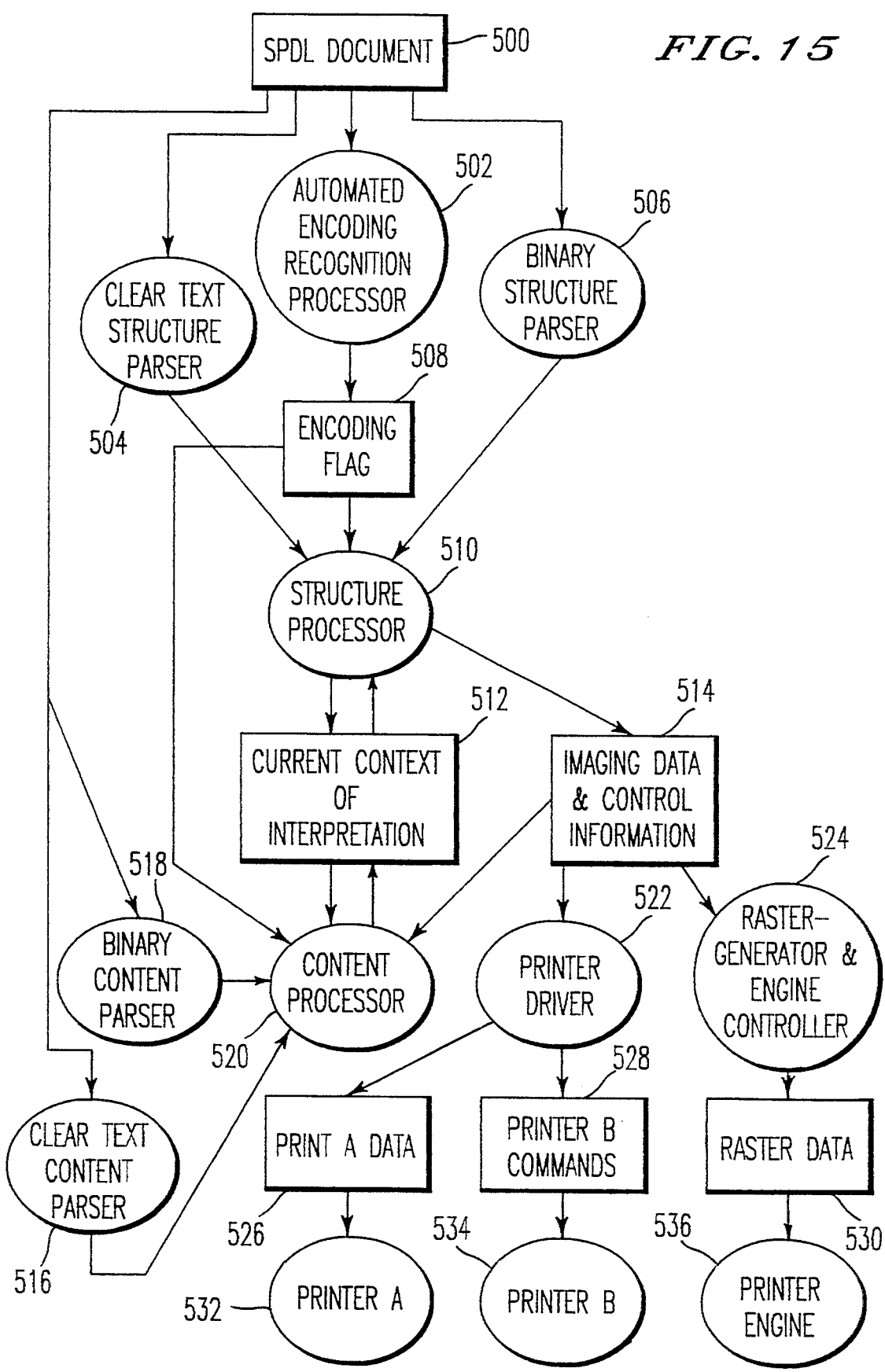
FIG. 15 illustrates a system used to process and print an SPDL file.

FIG. 15 is an illustration of a conceptual implementation of a device used to process and print an SPDL document. The elements of FIG. 15 have been illustrated as separate processors, parsers, drivers and encoders. However, it is possible for all of these conceptual processes to be contained within one hardware implementation containing one CPU. In FIG. 15, the oval shapes denote processes or processors and the rectangular shapes denote data.

As illustrated in FIG. 15, the SPDL document 500 is available to the automatic encoding recognition processor 502, the clear text structure parser 504, the binary structure parser 506, the clear text content parser 516, and the binary content parser 518. First, the SPDL document is transmitted to the automatic encoding recognition processor 502 which determines if the file is in a binary or clear text SPDL format according to the process of the present invention. If the file is in a clear text SPDL format, the clear text structure parser 504 parses the clear text structure into tokens which are transmitted to structure processor 510. If the SPDL document is a binary encoded SPDL document, the binary structure parser 506 parses the tokens and transmits them to the structure processor 510. The structure processor 510 receives encoding flag 508 from the automatic encoding recognition processor 502 so that the structure processor is informed of whether the processing is of binary parsed tokens or clear text parsed tokens.

SPDL documents contain structure and content elements. The structure of a document defines how the contents such as text or image data will be processed. The context processor 520 processes the parsed content received from the clear text context parser 516 or the binary content parser 518 depending on how the encoding flag 508 is set.

The structure processor and content processor communicate through the current context of interpretation 512. The current context of interpretation defines the state of the processing system and contains an operand stack, a set of dictionaries, a state variable table, resources available to the processing system, and the state of the virtual machine, for example. The processed structure and processed content from structure processor 510 and content processor 520 respectively, transmit imaging data and control information 514 to a print driver 522 and/or raster generator and engine controller 524. The print driver 522 converts the processed SPDL document into a language understandable by printer A 532 or printer B 534. For example, printer A can be a conventional PostScript ® printer and the print driver 522 converts the processed SPDL document to printer A data which is a PostScript file. Alternatively, the printer driver 522 can convert the processed SPDL file to an escape sequence printing language containing escape commands which are compatible with the HP Laserjet ® series printers. These printer B commands 528 are transmitted to the printer B which is for example an HP Laserjet ® compatible printer. However, it is possible for any printer to be supported by the processing system of FIG. 15 as long as printer driver 522 can convert the processed SPDL document into a printer language which is compatible with the printer. The imaging data and control information 514 can also be transmitted to a raster generator and engine controller 524 which instead of generating a printer file containing printer commands or PostScript data, converts the SPDL file to raster data 530 which is transmitted directly to the printer engine 536.

Obviously, numerous modifications and variations of the present invention are possible in light of the above teachings. For example, the file or commands being examined can first be examined to determine if they are clear text commands and can subsequently be examined to determine if they are binary commands. It is therefore to be understood that within the scope of the appended claims, the invention may be practiced otherwise than as specifically described herein.

What is claimed as new and desired to be secured by Letters Patent of the United States is:

1. A method for determining whether page description language commands are encoded in a binary or textual format, comprising the steps:

processing said commands under the encoding rules of ISO/IEC 8825;

determining if any of three beginning tags of said commands contain an object identifier encoded with four octets of hex values "28 CF 44 00" and, if an object identifier encoded with four octets of hex values "28 CF 44 00" is found, determining that said commands are in a binary format, and terminating processing of said method;

returning to a beginning of the commands, processing the commands under a textual encoding format and reading first and subsequent bytes of the commands until said bytes do not contain a byte selected from the group of bytes representing a Space, CR, LF, or Tab;

determining if subsequent bytes contain a character string "<!DOCTYPE", without regard to capitalization, and if "<!DOCTYPE", without regard to capitalization is determined not exist, terminating processing of said method because the document is a non-SPDL document;

examining a next byte of the commands for bytes representing a Space, CR, LF, or Tab characters and if the next byte is not represented of one of the Space, CR, LF or Tab characters, indicating that the document is non-SPDL document and determining processing of said method;

reading subsequent bytes of the commands until a subsequent byte does not contain bytes representative of any of the characters Space, CR, LF, or Tab; and examining said subsequent bytes which do not contain the characters Space, CR, LF, or Tab for characters including SPDL without regard to capitalization and if characters including SPDL without regard to capitalization are found, indicating said commands are encoded in a textual format.

2. A method according to claim 1, wherein the document is processed in a print controller interfacing a print engine.

3. A method according to claim 1, wherein the document is processed in a print server connected to at least one printer.

4. A method according to claim 1, wherein the document is processed in a workstation.

5. A method according to claim 1, further comprising the steps, performed after the commands are determined to be in a binary or textual format:

selecting one of a plurality of printer languages;

processing the commands into the selected printer language; and transmitting the processed commands to a printer which is compatible with the selected printer language.

6. A method according to claim 5, wherein the document is processed in a print controller interfacing a print engine.

7. A method according to claim 5, wherein the document is processed in a print server connected to at least one printer.

8. A method according to claim 5, wherein the document is processed in a workstation.

9. An apparatus for determining whether page description commands are encoded in a binary or textual formal, comprising:

means for parsing said commands under the encoding rules of ISO/IEC 8825;

binary determining means for determining if any of three beginning tags of said commands contain an object identifier encoded with four octets of hex values "28 CF 44 00";

means for parsing the document in binary if the binary determining means determines that the first three tags of said commands contain an object identifier encoded with four octets of hex values "28 CF44 00";

clear text determining means for determining if a beginning of the commands contains bytes representing zero or more spaces, carriage returns, line feeds, or tabs followed by pattern "<!DOCTYPE" without regard to capitalization, followed by bytes representing one or more spaces, carriage returns, line feeds, or tabs, followed by characters including SPDL without regard to capitalization;

means for parsing the commands in clear text if the clear text determining means determines that the file has been encoded in clear text.

10. An apparatus according to claim 9, wherein the apparatus comprises a print controller interfacing a print engine.

11. An apparatus according to claim 9, wherein the apparatus comprises a print server connected to at least one printer.

12. An apparatus according to claim 9, wherein the apparatus comprises a work station.

13. An apparatus according to claim 9, further comprising:

means for selecting one of a plurality of printer languages into which the commands to be processed; and means for processing the commands into the selected printer language.

14. An apparatus according to claim 13, wherein the apparatus comprises a print controller interfacing a print engine.

15. An apparatus according to claim 13, wherein the apparatus comprises a print server connected to at least one printer.

16. An apparatus according to claim 13, wherein the apparatus comprises a work station.

17. A method for determining whether page description language commands are encoded in a binary or textual format, comprising the steps:

processing said commands under the encoding of ISO/IEC 8825;

determining if beginning tags of said commands contain an object identifier indicating that said command are encoded under a binary SPDL format, and if said commands are determined to be encoded under the binary SPDL format, terminating processing of said method;

returning to a beginning of the commands, processing the commands under a textual encoding format and reading first and subsequent bytes of the commands until said bytes do not contain a byte selected from the group of bytes representing a Space, CR, LF, or Tab;

determining if subsequent bytes contain a character string indicating that said commands are encoded in a clear text SPDL format; and if said command are determined not to be encoded in a clear text SPDL format or binary SPDL format, indicating that said commands are from an non-SPDL file.

18. A method according to claim 17, wherein the document is processed in a print controller interfacing a print engine.

19. A method according to claim 17, wherein the document is processed in a print server connected to at least one printer.

20. A method according to claim 17, wherein the document is processed in a workstation.

21. A method according to claim 17, further comprising the steps, performed after the commands are determined to be in a binary SPDL or clear text SPDL format:

selecting one of a plurality of printer languages;

processing the commands into the selected printer language; and transmitting the processed commands to a printer which is compatible with the selected printer language.

22. A method according to claim 21, wherein the document is processed in a print controller interfacing a print engine.

23. A method according to claim 21, wherein the document is processed in a print server connected to at least one printer.

24. A method according to claim 21, wherein the document is processed in a workstation.

25. An apparatus for determining whether page description commands are encoded in a binary or textual SPDL format, comprising:

binary determining means for determining if any of three beginning tags of said commands contain an object identifier indicating that the commands are in a binary SPDL format;

means for parsing the document in binary if the binary determining means determines that the first three tags of said commands contain an object identifier indicating that the commands are in a binary SPDL format;

clear text determining means for determining if a beginning of the file commands bytes representing zero or more spaces, carriage returns, line feeds, or tabs followed by a pattern indicating that the commands are in a clear text SPDL format; and means for parsing the commands in clear text if the clear text determining means determines that the file has been encoded in a clear text SPDL.

26. An apparatus according to claim 25, wherein the apparatus comprises a print controller interfacing a print engine.

27. An apparatus according to claim 25, wherein the apparatus comprises a print server connected to at least one printer.

28. An apparatus according to claim 25, wherein the apparatus comprises a work station.

29. An apparatus according to claim 25, further comprising:

means for selecting one of a plurality of printer languages into which the commands to be processed; and means for processing the commands into the selected printer language.

30. An apparatus according to claim 29, wherein the apparatus comprises a print controller interfacing a print engine.

31. An apparatus according to claim 29, wherein the apparatus comprises a print server connected to at least one printer.

32. An apparatus according to claim 29, wherein the apparatus comprises a work station.

* * * * *

UNITED STATES PATENT AND TRADEMARK OFFICE
CERTIFICATE OF CORRECTION

PATENT NO. : 5,438,650
DATED      : August 1, 1995
INVENTOR(S): Tetsuro MOTOYAMA, et al.

It is certified that error appears in the above-indentified patent and that said Letters Patent is hereby corrected as shown below:

On the title page, Item [75], the first inventor's name should read:

--Tetsuro Motoyama--

Signed and Sealed this

Twelfth Day of September, 1995

Attest:

BRUCE LEHMAN

Attesting Officer

Commissioner of Patents and Trademarks